(12) United States Patent
Tiberghien et al.

(10) Patent No.: US 7,275,563 B2
(45) Date of Patent: Oct. 2, 2007

(54) CONNECTION AND PART OF SUCH A CONNECTION

(75) Inventors: Alain-Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 98 days.

(21) Appl. No.: 11/019,546

(22) Filed: Dec. 23, 2004

(65) Prior Publication Data

US 2005/0164538 A1    Jul. 28, 2005

(30) Foreign Application Priority Data

Dec. 26, 2003   (FR) .................................. 03 15462

(51) Int. Cl.
  *F16L 37/32* (2006.01)
(52) U.S. Cl. ............................... 137/614.04; 251/149.6
(58) Field of Classification Search ............ 137/614.04
  See application file for complete search history.

(56) References Cited

U.S. PATENT DOCUMENTS

| 3,427,051 A |   | 2/1969  | White et al. |  |
|---|---|---|---|---|
| 4,700,743 A |   | 10/1987 | L'Henaff et al. |  |
| 5,215,122 A | * | 6/1993  | Rogers et al. | 137/614.04 |
| 5,322,330 A |   | 6/1994  | Remsburg |  |
| 5,360,035 A | * | 11/1994 | Smith | 137/614.04 |
| 5,398,723 A |   | 3/1995  | Allread et al. |  |
| 5,762,106 A | * | 6/1998  | Smith, III | 137/614.04 |
| 5,810,048 A | * | 9/1998  | Zeiner-Gundersen | 137/614.04 |
| 5,890,517 A | * | 4/1999  | Laible | 137/614.04 |
| 5,899,228 A | * | 5/1999  | Smith, III | 137/614.04 |
| 6,237,965 B1 |   | 5/2001  | Kuo |  |
| 6,257,625 B1 |   | 7/2001  | Kitani et al. |  |
| 6,286,556 B1 |   | 9/2001  | Kato |  |

FOREIGN PATENT DOCUMENTS

| DE | 537404 | 2/1931 |
| EP | 0 870 965 | 10/1998 |
| FR | 2578950 | 9/1986 |
| GB | 1147862 | 4/1969 |

* cited by examiner

*Primary Examiner*—Eric Keasel
*Assistant Examiner*—Cloud Lee
(74) *Attorney, Agent, or Firm*—Dowell & Dowell, P.C.

(57) ABSTRACT

A connection for flow of a fluid, comprising first and second bodies, female and male connection elements that are respectively pivoted on the first and second bodies and hollow and complementary such that the male connection element may be seated within the female connection element, and wherein an angle of pivoting of each of the male and female elements is limited relative to a median position thereof.

19 Claims, 1 Drawing Sheet

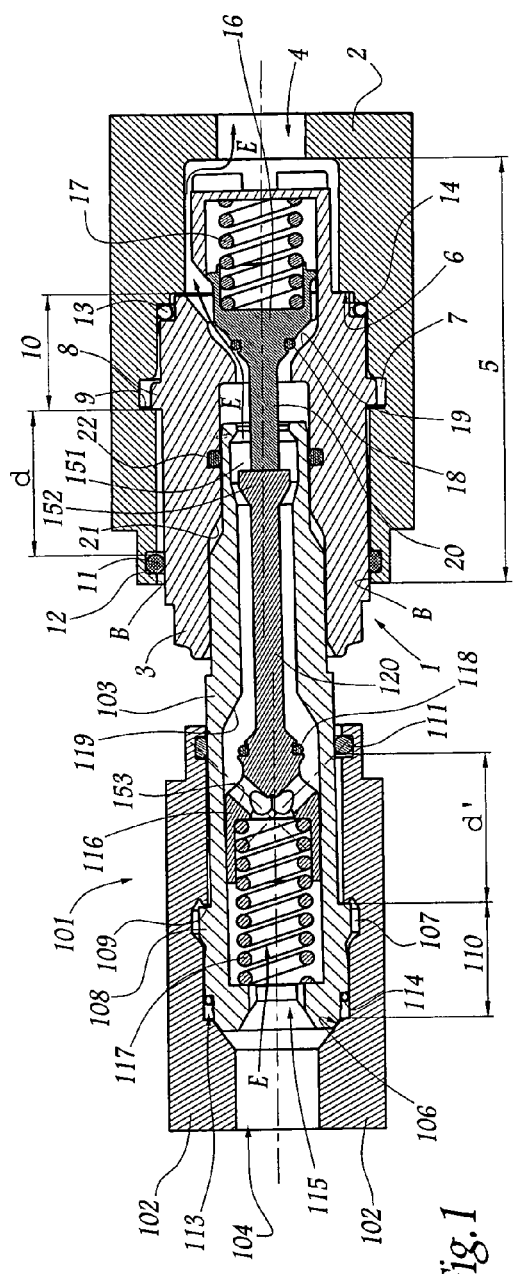
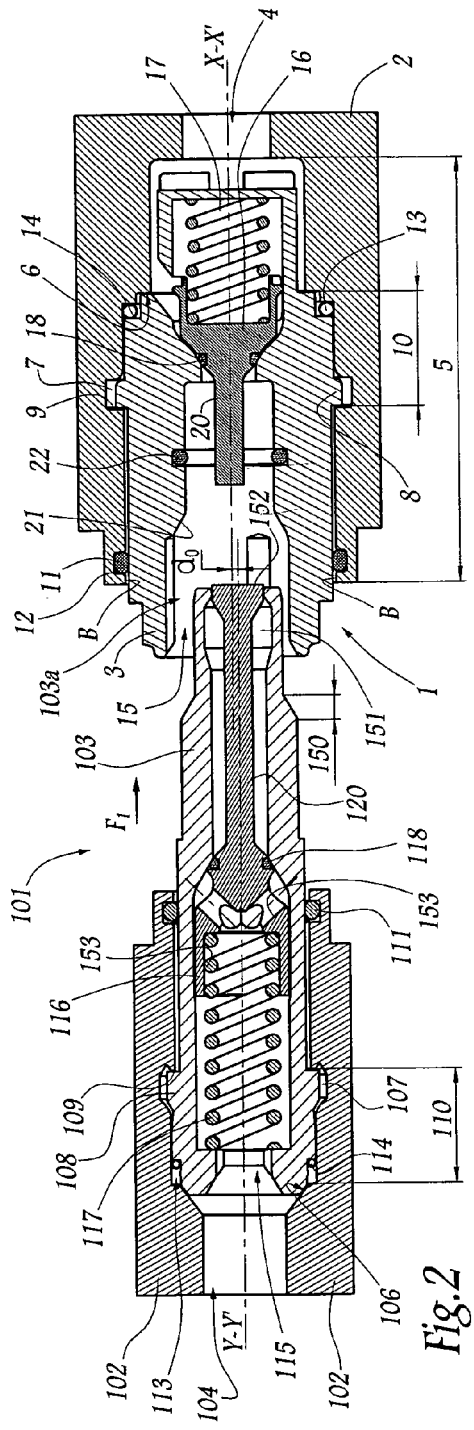
Fig.1
Fig.2

CONNECTION AND PART OF SUCH A CONNECTION

FIELD OF THE INVENTION

The present invention relates to a connection and to a connection part intended to be assembled with another, complementary connection part in order to form such a connection.

BACKGROUND OF THE INVENTION

Generally, the parts of a connection respectively comprise a male connection element and a female connection element. The male connection element may be fitted in the female connection element by hand. Particularly when it takes place under the sea, such fit may also result from a mechanical device displacing a support provided with one of the parts of the connection towards another support provided with the other part of the connection. When such is the case, it may happen that the male connection element and the female connection element are not well aligned with respect to each other during fit. This may render such fit difficult and may be translated by the connection being less tight, by a deterioration of at least one of the male and female connection elements and/or by the presence of unnecessary stresses in the connection, in the supports and in the means for mounting the parts of the connection on the supports.

It is therefore at least one object of the invention to improve the quality of a connection resulting from a fit made by a mechanical device.

SUMMARY OF THE INVENTION

To that end, the invention relates to a connection for the flow of a fluid, comprising at least a first body, a second body and two female and male connection elements which are hollow and complementary, this female connection element and this male connection element being respectively pivoted on the first body and on the second body, characterized in that it comprises means for returning each of the male and female elements towards a median position and/or for limiting the angle of pivoting of each of the male and female elements from this median position.

Advantageous and non-obligatory characteristics of this connection will be apparent in claims 2 to 8.

The invention also relates to a part of a connection for the flow of a fluid, intended to be assembled with another connection part in order to form a connection, and comprising:

- a female or male hollow connection element,
- a body defining a passage and bearing the connection element,
- means for pivotally mounting the connection element,
- an O-ring disposed at the level or in the vicinity of a pivoting zone of the connection element with respect to the body and between the body and the connection element, so that the passage and the connection element are connected tightly, characterized in that it comprises elastic means for returning the connection element towards a median position, these elastic return means being at a distance from the pivoting zone.

Advantageous and non-obligatory characteristics of this connection part will be apparent in claims 10 to 17.

BRIEF DESCRIPTION OF THE DRAWINGS

The invention will be more readily understood on reading the following description, given solely by way of example and made with reference to the accompanying drawings, in which:

FIG. 1 schematically shows an axial section of a connection according to the invention and assembled; and FIG. 2 is a section similar to FIG. 1 and illustrates the assembly of two constituent parts of the connection shown in this FIG. 1.

DESCRIPTION OF PREFERRED EMBODIMENT

Referring now to the drawings, FIG. 1 schematically shows a connection which is more particularly intended to be used under the sea and which comprises two parts 1 and 101 assembled together. In FIG. 2, these parts 1 and 101 are in the course of being assembled.

Part 1 of the connection comprises a body 2 and a female connection element 3 of axis X-X', borne by this body 2.

Body 2 defines a through passage 4 in a widened end portion 5 of which the female connection element 3 is engaged. At the level of this end portion 5, the body 2 comprises an inner annular shoulder 6 and defines an inner annular groove 7 in which penetrates a collar 8 of the female connection element 3. The shoulder 6 and one side 9 of the groove 7 form two stops for the female connection element 3. These two stops, which face in opposite directions parallel to axis X-X', axially retain the female connection element 3 in the body 2 with reduced clearance.

The female connection element 3 presents a lateral clearance which is reduced and may even be non-existent at the level of a zone 10 of pivoting of this female element 3 on the body 2.

At a distance from the pivoting zone 10, the body 2 defines a lateral stop B for the connection element 3 and thus limits the angle by which this connection element 3 may be pivoted with respect to the body 2.

The shoulder 6 and the side 9 of the groove 7 form mounting means thanks to which the female connection element 3 is pivoted on the body 1 so as to be able to oscillate about a median position. Elastic means for returning the female connection element 3 into this median position, which is the one illustrated in FIG. 2, are constituted by an annular member 11 made of elastomer which surrounds the female connection element 3, in the vicinity of the opening of the element 3 and at a distance d from the pivoting zone 10, and which is compressed between the body 2 and the element 3. In the example shown, this elastomeric member 11 is an O-ring housed in an inner annular groove 12 of the body 2.

At the level of the pivoting zone 10, the body 2 and the element 3 together define an annular space 13 in which is compressed an annular seal 14. This latter has the function of ensuring seal of the connection from passage 4 to a through passage 15 that the element 3 defines. In the example shown, it is question of a metallic seal.

The female connection element 3 contains a valve 16 and a spring 17 for returning this valve 16 towards a position of obturation of the passage 15. The closure valve 16 bears an O-ring 18 intended to render tight the obturation of the passage 15 by this valve 16. In FIG. 2, the valve 16 is pressed by the spring 17 against an inner seat 19 of the female connection element 3, so that it obturates is the passage 15. Towards the free end of the female connection element 3, the valve 16 terminates in a finger 20.

The passage 15 comprises a convergent portion which narrows in the direction of the arrow $F_1$ shown in FIG. 2.

At a greater depth than this convergent portion 21 with respect to the opening of the element 3, the female connection element 3 defines a narrowed passage having an inner annular groove in which is housed an O-ring 22.

FIGS. 1 and 2 are schematic views, particularly in that the body 2 and the connection element 3 are shown therein as each being in one piece. In reality, the body 2 results from the assembly of at least two pieces which are dissociated during the installation of the connection element 3, so that the collar 8 does not oppose this installation. Similarly, the connection element 3 results from the assembly of two pieces which are dissociated for the installation of the valve 16 and of the spring 17.

The constitution of the connection part 101 is generally similar to that of the connection part 1. A reference used hereinafter for designating an element of the connection part 101 similar or equivalent to a referenced element of the connection part 1 is obtained by increasing by 100 the reference denoting this element on the connection part 1. In this way are obtained the references of the body 102, the passage 104, the groove 107, the collar 108, the side 109 forming stop, the pivoting zone 110, the return member 111, the annular space 113, the O-ring 114, the passage 115, the closure valve 116, the spring 117, the seat 119 and the finger 120 constituting the connection part 101.

Reference d' denotes the distance equivalent to distance d, defined here between the zone 110 and the member 111.

Whatever does not distinguish the part of the connection 101 from the part of the connection 1 is not described in the following.

Reference 103 denotes a male connection element complementary of the female connection element 3. This element 103 comprises a portion 150 where it progressively thins in the direction of arrow $F_1$, i.e. in the direction of its free or front end 103a.

The inner surface 106 which forms a stop for the male connection element 103 does not present the shape of a shoulder but of a truncated surface located at the bottom of the widened end portion 105.

At the level of the pivoting zone 110, the outer surface of a portion of the male connection element 103 presents a convex axial section.

In the vicinity of the free end of the male connection element 103, the passage 115 comprises a widening 151. The free end of the finger 120 presents the form of a swell 152 for obturation. In FIG. 2, the valve hermetically closes the passage 115 at the level of the seat 119, while its swell 152 closes this passage 115 at the level of the free end 103a of the element 103 in order to prevent pollutants such as mud or sediments from being able to penetrate therein. Through passages 153 are made in the valve 116, between the O-ring 118 thereof and the spring 117.

In FIG. 2, an actuation device (not shown) connecting the bodies 2 and 102 and comprising one or more actuators, displaces the connection part 101 in the direction indicated by arrow $F_1$, i.e. towards the connection part 1, of which the body 2 is fixed. The free end of the male connection element 103 has just penetrated in the passage 15 and is located in the widest portion thereof.

Still in FIG. 2, the axis X-X' of the female connection element 3 and the axis Y-Y' of the male connection element 103 are offset laterally with respect to each other by a distance $d_0$. In other words, there is a poor alignment of the female and male connection elements. Due to the return force exerted by the elastomeric members 11 and 111, this alignment is not accompanied by an inclination of axes X-X' and Y-Y with respect to each other, which is an advantage.

After having entered in the passage 15, the free end of the male connection element 103 encounters the wall defining the convergent portion 21, this leading to a pivoting of the female 3 and male 103 connection elements which thus come into alignment with respect to each other, by themselves. Thanks to that, the female 3 and male 103 connection elements are not mutually deteriorated during connection thereof, despite their poor alignment at the start.

After the free end of the male connection element 103 has gone beyond the convergent portion 21, the free ends of the fingers 20 and 120 meet each other, so that the valves 16 and 16 are mutually actuated towards the positions of opening of the passages 15 and 115. Once the free end of the male connection element 103 has gone beyond the O-ring 22, the connector parts 1 and 101 are connected and the displacement of the body 102 in the direction $F_1$ is stopped, after which the connection is as illustrated in FIG. 1.

In this FIG. 1, the male connection element 103 is fitted in the female connection element 3. The swell 152 is located at the level of the widening 151. The female 3 and male 103 connection elements which are not obturated by the valves 16 and 116, connect the passages 4 and 104 to each other. Seal of the connection of the female element 3 with the male element 103 is ensured by the O-ring 22. In accordance with the object of the invention, the quality of the seal is good thanks to the self-alignment of the female 3 and male 103 connection elements, whose pivoting compensates their original misalignment.

Moreover, this original misalignment is translated only by very weak stresses in the pieces constituting the connection, such as the stresses relative to the compression of the elastomeric return members 11 and 111. In FIG. 1, arrows E represent the flow of a fluid in the connection. Of course, this fluid may flow in the direction opposite that indicated by these arrows.

The invention is not limited to the embodiment described hereinabove. In particular, during the connection, the connection part 1 may be displaced towards the connection part 101 whose body 102 is in that case fixed.

Moreover, the two stops 6 and 9 and 106 and 109, as well as the corresponding parts of the female 3 or male 103 connection element may be truncated and be inscribed in a sphere whose envelope is substantially centred on the point about which this female 3 or male 103 connection element pivots. They may equally well be spherical or merge with this sphere. In either case, the purpose is to facilitate pivoting of the female 3 or male 103 connection element with respect to the body 2 or 102 on which it is mounted.

What is claimed is:

1. A connection for flow of a fluid, comprising:
   a first body;
   a second body;
   a female connection element and a male connection element, said female and male connection elements are hollow and complementary such that said male connection element may be seated within said female connection element, and said female and male connection elements are respectively pivotally mounted within said first body and within said second body;
   a first valve mounted within said female connection element, said first valve being mounted to close a first valve seat within said female connection element;
   a second valve mounted within said male connection element, said second valve being mounted to close a second valve seat within said male connection element when said male connection element is disconnected from said female connection element and to open said second valve seat by moving inwardly within said male connection element;
a first means for limiting an angle of pivoting of said female connection member; and
a second means for limiting an angle of pivoting of said male connection element.

2. The connection of claim 1, wherein the angle of pivoting of each of said male and female connection elements is with respect to a median position thereof within said first and second bodies.

3. The connection of claim 1, furthering including means for urging each of said male and female connection elements toward a median position thereof within said first and second bodies.

4. The connection of claim 3, wherein each of said means for urging includes at least one annular member made of an elastomer for urging one of said female and male connection elements toward the median position, said at least one annular member being disposed around said one of said male and female connection elements, between said one of said male and female connection elements and one of said first and second bodies.

5. The connection of claim 1, further including means for urging each of said male and female connection elements toward a median position thereof within said first and second bodies; and wherein the angle of pivoting of each of said male and female connection elements is with respect to the median position thereof within said first and second bodies.

6. The connection of claim 1, wherein said male connection element includes an end portion of reduced diameter, and wherein said female connection element includes an inner passage having a convergent portion narrowing in a direction of introduction of said male connection element in said female connection element.

7. The connection of claim 1, wherein each of said means for limiting includes at least one lateral stop for one of said female or male connection elements, said at least one lateral stop surrounding said one of said female or male connection elements.

8. The connection of claim 1, wherein said female connection element includes a spring that returns said first valve toward a position of obturation of said female connection element, and wherein said male connection element includes a spring that returns said second valve toward a position of obturation of said male connection element, said first and second valves being adapted to actuate each other toward positions of opening after alignment of said male and female connection elements.

9. A connection of claim 1, wherein at least one of said female connection element and said male connection element includes:
a clearance between the connection element corresponding body, said clearance being such as to permit pivoting of the connection element within the body;
an O-ring disposed between the body and the connection element and spaced from an open end of the body so that the body and the corresponding connection element are connected tightly;
an elastic means positioned between the body and the corresponding connection element for directly engaging the connection element for urging the connection element toward a median position thereof within the body; and
wherein said O-ring is disposed in a vicinity of a pivoting zone of the connection element with respect to the corresponding body, and said elastic means is at a distance (d, d') from the pivoting zone so as to be in closer proximity to the open end of the body.

10. The connection of claim 9, wherein the body includes a wall forming a lateral stop for the corresponding connection element within the body, said lateral stop surrounding the connection element and limiting an angle by which the connection element may be pivoted from the median position.

11. The connection of claim 10, wherein said elastic means includes an annular elastomeric member disposed around said connection element, between the connection element and the body.

12. The connection of claim 10, wherein the pivoting zone is offset axially with respect to said lateral stop and, at the pivoting zone, the connection element has a lateral clearance in the body that is less than a lateral clearance at the lateral stop, and wherein said O-ring being located in a vicinity of the pivoting zone and extending between the body and the connection element.

13. The connection of claim 12, wherein said O-ring is a metallic seal.

14. The connection of claim 9, wherein said means for pivotally mounting the connection element includes two stops formed by the body, said two stops axially retaining the connection element with reduced clearance within the corresponding body.

15. The connection of claim 14, wherein at least one of said two stops is substantially truncated in shape.

16. The connection of claim 14, wherein at least one of said two stops is a side of an annular groove in which a collar of the connection element is engaged with clearance.

17. The connection of claim 9, wherein the connection element is a male connection element and includes a valve and an elastic member for returning said valve toward a position of obturation in which said valve both hermetically obturates the connection element at a distance from a free end of the connection element and closes the free end.

18. The connection of claim 1, further comprising; means for opening said first and second valves only after said female and male connection elements have been initially connected and aligned, wherein said male connection element includes an end portion receivable within a narrowed passage within said female element so as to initially connect and align said female and male connection elements with one another.

19. The connection of claim 18, wherein said means for opening includes:
a first projection on said first valve, said first projection extending into said narrowed passage;
a second projection on said second valve, said second projection extending to and closing a tree end of said end portion of said male connection element when the male and female connection elements are disconnected;
first spring means mounted within said female connection element for urging said first projection into said narrowed passage; and
second spring means mounted within said male connection element for urging said second projection to close said free end of said end portion of said male connection element when the male and female connection elements are disconnected.

* * * * *